United States Patent [19]
Jones

[11] Patent Number: 5,431,788
[45] Date of Patent: Jul. 11, 1995

[54] CHLORIDE ASSISTED HYDROMETALLURGICAL COPPER EXTRACTION

[75] Inventor: David L. Jones, Delta, Canada

[73] Assignee: Cominco Engineering Services Ltd., Vancouver, Canada

[21] Appl. No.: 98,874

[22] Filed: Jul. 29, 1993

[30] Foreign Application Priority Data

Jun. 28, 1993 [CA] Canada ................. 2099333

[51] Int. Cl.⁶ ............................................. B01D 61/44
[52] U.S. Cl. ................................ 204/104; 204/107; 204/108; 204/182.4
[58] Field of Search ............ 204/107, 108, 104, 182.4; 423/27, 36, 41, 39, 45, 46

[56] References Cited

U.S. PATENT DOCUMENTS

| | | | |
|---|---|---|---|
| 3,844,927 | 10/1974 | Smith | 204/301 |
| 3,923,616 | 12/1975 | Atadan et al. | 204/107 |
| 4,039,406 | 8/1977 | Stanley et al. | 204/108 |
| 4,338,168 | 7/1982 | Stanley et al. | 204/108 |
| 4,971,662 | 11/1990 | Sawyer et al. | 204/107 |

OTHER PUBLICATIONS

Stanley et al., "A Hydrometallurgical Conversion Process for the treatment of copper concentrate," Aug.-Sep./1982 pp. 1-31.
Paper entitled "A Hydrometallurgical Conversion Process For The Treatment of Copper Concentrate", Authors: R. W. Stanley et al of the Noranda Research Centre, Presented at the 21st Annual CIM Conference Of Metallurgists, Toronto, Canada, Aug. 29-Sep. 1/82.

*Primary Examiner*—John Niebling
*Assistant Examiner*—Arun S. Phasge
*Attorney, Agent, or Firm*—Elbie R. De Kock

[57] ABSTRACT

A process for the extraction of copper from a sulphide copper ore or concentrate comprises subjecting the ore or concentrate to a first leaching at an elevated temperature and pressure in the presence of oxygen and a lixiviant which comprises an acidic solution of chloride and bisulphate or sulphate ions to produce an insoluble basic copper sulphate. The basic copper sulphate so produced is leached in a second leaching preferably at atmospheric pressure with an acidic sulphate solution to dissolve the basic copper salt to produce a leach liquor containing copper sulphate in solution. The resulting leach liquor is subjected to solvent extraction to produce a copper concentrate solution and a raffinate comprising protons and bisulphate or sulphate ions in solution. Protons, and bisulphate or sulphate ions are extracted from the raffinate to produce a sulphuric acid solution which sulphuric acid solution is then recycled to the first leaching at elevated pressure and temperature to serve as a source of bisulphate or sulphate ions in the lixiviant. According to a preferred embodiment, the extraction of the protons and bisulphate or sulphate ions from the raffinate is effected by means of an electrodialysis process. In alternative embodiments copper sulphate is also extracted from the raffinate and recycled to the first leaching step or alternatively a source of bisulphate or sulphate ions, such as a hydrolyzable metal sulphate, is introduced from another source.

16 Claims, 2 Drawing Sheets

CHLORIDE ASSISTED HYDROMETALLURGICAL COPPER EXTRACTION

FIELD OF THE INVENTION

This invention relates to a hydrometallurgical treatment of copper sulphide ores or concentrates in the presence of chloride ions.

BACKGROUND OF THE INVENTION

Effective hydrometallurgical treatment of copper sulphide ores, such as chalcopyrite ($CuFeS_2$) has been a long standing goal in the copper mining industry which has thus far eluded success. The problem lies in the fact that the severe conditions required for the effective leaching of copper from these ores results in oxidation of the sulphide in the ore or concentrate to sulphate, resulting in the generation of acid which requires expensive neutralization, rendering the process impractical and uneconomical. Attempts have been made to render the sulphide concentrate leachable under relatively milder conditions under which the sulphide would only be oxidized to elemental sulphur and not all the way through to sulphate. These attempts include the pretreatment of the concentrate prior to the pressure leaching step to render the sulphide concentrate more readily leachable, and the leaching of the concentrate in the presence of chloride ions, such as described in U.S. Pat. No. 4,039,406. In this process, the copper values in the concentrate are transformed into a solid basic copper sulphate from which the copper values must then be subsequently recovered, as described in U.S. Pat. No. 4,338,168. In the process described in U.S. Pat. No. 4,039,406 a significant amount (20-25%) of sulphide in the ore or concentrate is still oxidized to sulphate, resulting in greater oxygen demand during the pressure leach and the generation of sulphuric acid.

It is accordingly an object of the present invention to provide a hydrometallurgical copper extraction process wherein the oxidation of sulphide in the ore or concentrate to sulphate is reduced.

SUMMARY OF THE INVENTION

According to the invention, there is provided a process for the extraction of copper from a sulphide copper ore or concentrate, comprising the steps of subjecting the ore or concentrate to a first leaching at an elevated temperature and pressure in the presence of oxygen and a lixiviant comprising an acidic solution of chloride and bisulphate or sulphate ions to produce an insoluble basic copper salt; leaching the basic copper salt produced by said first leaching step in a second leaching with an acidic sulphate solution to dissolve the basic copper salt to produce a leach liquor containing copper sulphate in solution; subjecting said leach liquor to a solvent extraction process to produce a copper concentrate solution and a raffinate comprising protons and bisulphate or sulphate ions in solution; extracting protons and bisulphate or sulphate ions from said raffinate to produce a sulphuric acid solution; and recycling said sulphuric acid solution to said first leaching at elevated temperature and pressure to serve as a source of said bisulphate or sulphate ions in said lixiviant.

According to a preferred embodiment, the raffinate is subjected to electrodialysis to effect said extraction of protons and bisulphate or sulphate ions therefrom.

Also according to the invention, there is provided a process for the extraction of copper from a sulphide copper ore or concentrate, comprising the steps of subjecting the ore or concentrate to a first leaching at an elevated temperature and pressure in the presence of oxygen and a lixiviant comprising an acidic solution of chloride and bisulphate or sulphate ions to produce an insoluble basic copper salt; leaching the basic copper salt produced by said first leaching step in a second leaching with an acidic sulphate solution to dissolve the basic copper salt to produce a leach liquor containing copper sulphate in solution; subjecting said leach liquor to a solvent extraction process to produce a first copper concentrate solution and a raffinate comprising protons, copper ions and bisulphate or sulphate ions in solution; extracting copper ions and bisulphate or sulphate ions from said raffinate to produce a second copper concentrate solution; recycling said second copper concentrate solution to said first leaching at elevated temperature and pressure to serve as a source of said bisulphate or sulphate ions in said lixiviant; and subjecting said first copper concentrate solution to electrowinning to recover copper values therefrom.

Further according to the invention, there is provided a process for the extraction of copper from a sulphide copper ore or concentrate, comprising the steps of subjecting the ore or concentrate to a first leaching at an elevated temperature and pressure in the presence of oxygen and a solution of chloride ions and at an acidic pH to produce an insoluble basic copper salt; adding to said solution, during said first leaching, a source of bisulphate or sulphate ions selected from the group consisting of sulphuric acid, copper sulphate and a metal sulphate which hydrolyzes at said acidic pH and providing sufficient of said source of bisulphate or sulphate ions to react said source of bisulphate or sulphate ions with said ore or concentrate so that there is a nett consumption of bisulphate or sulphate ions from said source of bisulphate or sulphate ions to form said basic copper salt; and leaching said basic copper salt in a second leaching with an acidic sulphate solution to dissolve the basic copper salt to produce a leach liquor containing copper sulphate in solution.

Also according to the invention there is provided a process for producing a concentrated solution from a raffinate from a solvent extraction process, comprising the step of subjecting said raffinate to electrodialysis using a membrane which is selected to permit the passage of preselected ions for producing said concentrated solution.

In the present specification, elevated temperature means a temperature above room temperature (25° C.), preferably from about 125° C. to about 175° C., and elevated pressure means an oxygen partial pressure above atmospheric pressure, preferably from about 50 psig (345 kPa) to about 250 psig (1725 kPa).

Further objects and advantages of the invention will become apparent from the description of a preferred embodiment of the invention below.

DETAILED DESCRIPTION OF PREFERRED EMBODIMENT

Figure 1:
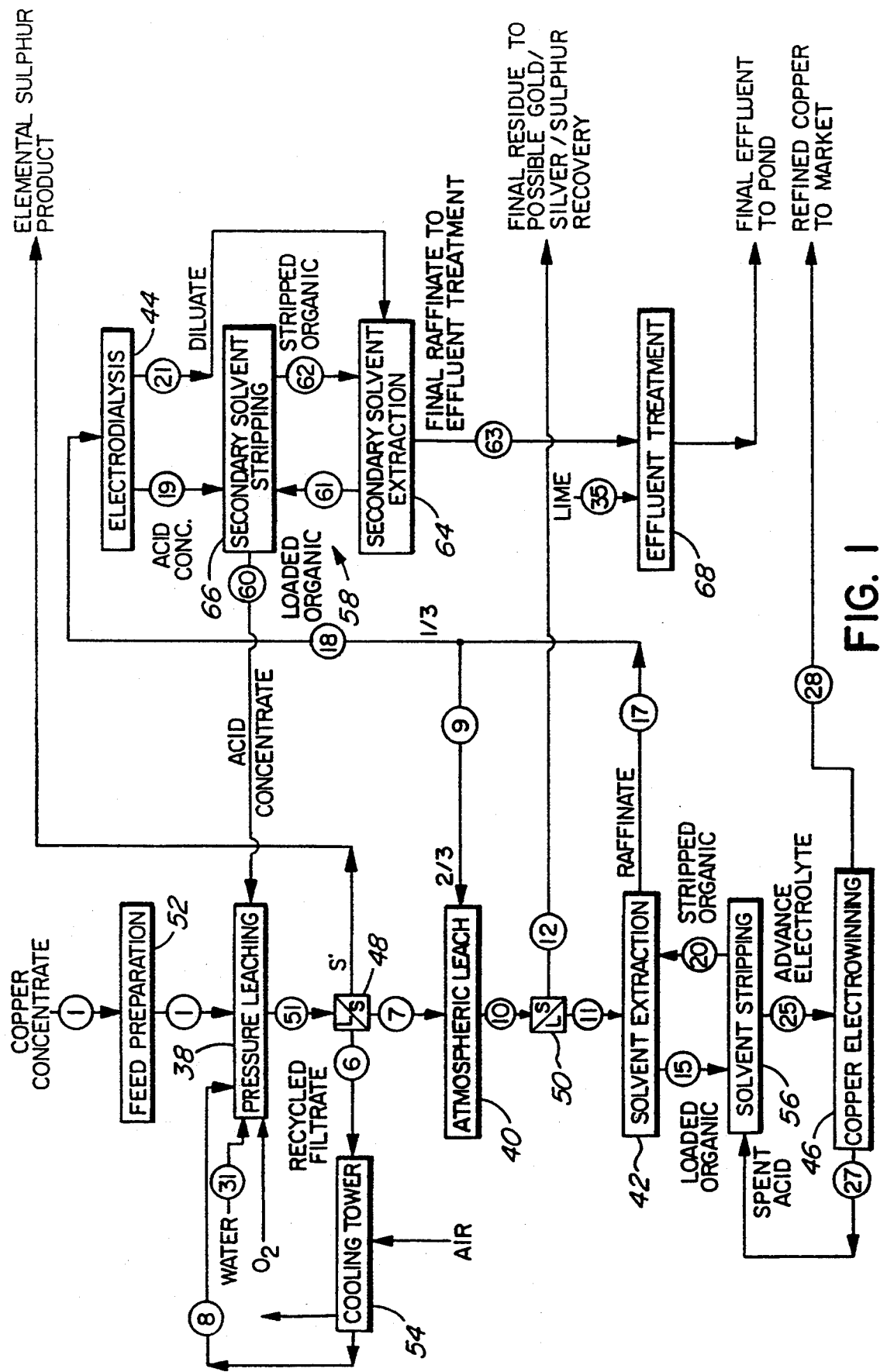
FIG. 1 is a flow diagram of a hydrometallurgical copper extraction process according to the invention.

The stages of the process comprise, principally, a pressure leaching stage 38 in an autoclave, an atmospheric leaching stage 40, solvent extraction and stripping stages 42 and 56, an electrodialysis stage 44 and an electrowinning stage 46.

After each of the leaching stages 38 and 40, thickening and/or filtration is carried out as indicated at 48 and 50, respectively, to separate the liquids and solids.

The process will now be described in greater detail by way of a specific example in which a chalcopyrite concentrate is treated.

The copper concentrate is first ground in a ball mill, during a feed preparation step 52, to reduce the size of the particles to about 80%-98% minus 325 Tyler mesh or smaller. Although satisfactory results are obtainable without regrinding, it has been found that there is a small but significant improvement with regrinding.

The concentrate is leached in the pressure leaching stage 38 at an elevated pressure and temperature with a lixiviant containing no copper or up to about 15 grams per liter copper, 6–18 grams per liter chloride and about 15–35 grams per liter sulphuric acid. About 80% of the lixiviant is leach liquor which is recycled (Stream 8). The remaining 20% comprises concentrated sulphuric acid which is recycled from the electrodialysis stage 44, as will be described in more detail below.

The temperature of the leach 38 is about 150° C. It has been found that if the temperature is too high, eg. above about 175° C. significant sulphur oxidation to sulphate takes place. The pressure is about 200 psig (1380 kPa). This is total pressure comprising oxygen pressure as well as the steam pressure. The retention time is about 0.5–2.5 hours and the process is normally carried out in a continuous fashion in the autoclave. The process can also be carried out in a batch-wise fashion and, in fact, the processes in the Examples below have been carried out in this way.

The solids content is maintained at about 15–20%, i.e. 170–250 grams per liter solids as determined by the heat balance and viscosity limitations. A higher percentage solids would require some form of heat removal to prevent the temperature from rising above the desired limit of about 150° C.

As referred to above, the lixiviant used in the pressure leach 38 is made up partly of recycled lixiviant from a previous pressure leach (Stream 8), which is very low in acid, i.e. pH 3 to pH 5, but augmented by an acid concentrate (Stream 60) which is recycled from the electrodialysis stage 44. The immediate effect of adding the acid concentrate to the lixiviant is to increase the acidity of the lixiviant which is fed to the autoclave for the pressure leaching stage 38, but the most important effect, surprisingly, has been found to be that the addition of the acid, or more specifically the sulphate ions, actually suppresses the oxidation of sulphur emanating from the concentrate during the pressure leaching stage 38.

Typically the oxidation of sulphur that is experienced if no acid recycle is used is about 25%-30% of the feed sulphur in the concentrate, as is the case with the process described in U.S. Pat. No. 4,039,406. However, if acid recycle is used, it has been found that the sulphur oxidation to sulphate is reduced to about 5–10%. This improvement has substantial beneficial effects on the hydrometallurgical extraction process. The oxidation of sulphur to sulphate creates additional costs in several ways, such as additional oxygen required for the reaction, additional reagent required to neutralize the acid so formed by the oxidation and provision must be made for heat removal due to the oxidation of sulphur to sulphate which is very exothermic. This actually limits the throughput of the autoclave in which the pressure leaching stage 38 takes place.

The chemistry of the reaction in the pressure leaching stage 38 is believed to be altered by the addition of the acid as follows:

No acid addition:

$$CuFeS_2 + 7/4 O_2 + \tfrac{1}{3}H_2O \rightarrow [\tfrac{1}{3}CuSO_4 \cdot \tfrac{2}{3}Cu(OH)_2] + \tfrac{1}{2}Fe_2O_3 + 5/3 S^0 \qquad (1)$$

With acid addition:

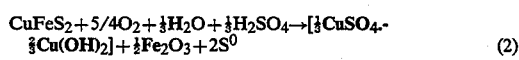

$$CuFeS_2 + 5/4 O_2 + \tfrac{1}{3}H_2O + \tfrac{1}{3}H_2SO_4 \rightarrow [\tfrac{1}{3}CuSO_4 \cdot \tfrac{2}{3}Cu(OH)_2] + \tfrac{1}{2}Fe_2O_3 + 2 S^0 \qquad (2)$$

In both reactions, the copper is precipitated in the form of a basic copper salt, which has been found to comprise about 90% of basic copper sulphate, which contains a sulphate anion, as indicated in the reaction equations, but about 10% of basic copper chloride is also formed. In the first reaction it appears that the sulphate of the basic copper sulphate is supplied by oxidation of the feed sulphur in the concentrate, whereas in the second reaction it appears to be supplied by the sulphate ions in the acid recycle, thus obviating the need for the oxidation of sulphur to sulphate. Thus in the second reaction, there is a net consumption of sulphate ions to form the basic copper salt.

In actual test work, there is more sulphur oxidation than is predicted by either reaction. The first reaction predicts one sixth or 16.7% of the sulphur to be oxidized whereas experimentally about 25%-30% is found. With acid addition, experiments indicate that about 5–10% sulphur is oxidized to sulphate, rather than the zero oxidation that would be predicted if the second reaction as written was the only reaction taking place. Therefore, these reaction equations do not reflect exactly what is happening in the pressure leaching stage 38 but are only an approximation.

In order to take advantage of the beneficial effect of the sulphuric acid recycle to inhibit the oxidation of sulphur, it is necessary to find efficient ways of adding acid into the autoclave, which has limited ability to absorb acid because the bulk of the leach liquor is recycled. However, there is some loss of leach liquor in the pressure leaching stage 38, due to venting (steam losses) and due to leach liquor carried off in the filter cake after the pressure leach stage 38 (Stream 7). It has been found that about 20% of the volume of leach liquor is lost during each cycle in this fashion. The amount of sulphuric acid needed to suppress sulphur oxidation has been found experimentally to be about 25 grams per liter. Therefore, since this amount of acid must be contained in 20% of the volume, it must come in a concentrated form, i.e.

$$\frac{25 \text{ grams per liter}}{20\%} = 125 \text{ grams per liter}$$

There is surplus acid produced in the solvent extraction stage 42 where the $CuSO_4$ solution is changed into an $H_2SO_4$ solution. However, the acid so produced is very dilute (Stream 17), only about 20–60 grams per liter, due to the nature of the solvent extraction chemistry. The difficulty cannot effectively be overcome by simply evaporating the raffinate (Stream 17) coming from the solvent extraction stages 42 and 56 to produce a concentrated acidic solution because it is necessary to eliminate impurities in the raffinate, such as iron and zinc, and evaporation followed by recycling would return the impurities to the pressure leaching stage 38.

This problem has been solved in the present invention by extracting sulphuric acid from the raffinate and in the particular embodiment described here, use is made of electrodialysis to effect this extraction. Thus, by introducing the electrodialysis stage 44, which will be described in more detail below, sulphuric acid is recovered from the raffinate in a concentrated form suitable for use in the pressure leaching stage 38.

The slurry produced by the pressure leach 38 is cooled to below 100° C. and then filtered 48 to separate the residue from the leach liquor or lixiviant, which is recycled through a cooling tower 54 to the leaching stage 38, as noted above.

The residue contains the copper originally present in the concentrate as insoluble basic copper sulphate and basic copper chloride together with all the other solid materials, such as $Fe_2O_3$ (hematite) and elemental sulphur.

There is a gain in the weight of the leach residue. Typically it has 30–40% more dry weight than the feed concentrate. It has been found that the leach residue contains about 0.5–2% chloride, as well as the copper, iron oxide and sulphur, which is due to the presence of the basic copper chloride and the basic copper sulphate. The iron in the chalcopyrite concentrate is converted almost completely to hematite, while sulphur is mostly converted to the elemental form with only a fraction (about 5–10%) being oxidized to sulphate, as noted above.

The leach liquor produced by the pressure leaching step 38 has much the same composition as the feed lixiviant except that there is a drop in the chloride concentration from about 12 grams per liter to about 7–10 grams per liter, depending on the conditions, due to the formation of the basic copper chloride.

The filter cake or leach residue is repulped in raffinate from the subsequent solvent extraction stage 42, which comprises an acidic sulphate solution containing about 20–60 grams per liter $H_2SO_4$ and a small amount of copper, about 0.5–5.0 grams per liter.

The second leaching stage 40 takes place at atmospheric pressure and a temperature of about 40° C. for a retention time of about 15–120 minutes. The percentage solids is typically about 6–11% or about 70–140 grams per liter, although it is quite possible to operate the process outside this range. A higher percentage solids in the second leaching 40 can produce a Cu concentration in the resultant leach liquor that is too high for the normal solvent extraction process, but this may be overcome by recycling of aqueous streams within the solvent extraction circuit. A higher percentage solids during leaching has the advantage of smaller capacity requirements, but has the disadvantage of higher entrained losses in the leach residue. The final acidity of the slurry is about pH 1.5–2.0 or about 1–5 grams per liter $H_2SO_4$.

During the atmospheric leaching stage 40, the basic copper salts dissolve almost completely with very little of the iron going into solution.

Typically, the leach liquor produced after filtration 50 contains about 10–40 grams per liter copper, depending on the percentage solids feed to the second leach 40, with less than 1 grams per liter iron and about 0.5–4.0 grams per liter chloride.

The copper extraction has been found to be about 97–98% based on the original feed to the pressure leaching stage 38. Iron extraction to solution has been found to be less than about 5%.

The main constituents of the solid residue (Stream 12) after filtration 50 are hematite and elemental sulphur, as well as any gold or silver which may have been present in the original concentrate. The sulphur can be recovered by screening or flotation to separate it from the hematite into a high-grade sulphur concentrate, which can be further treated for recovery of sulphur. The gold and silver can be recovered by cyanidation after sulphur is removed from the leach residue.

The copper leached in the atmospheric leaching stage 40 is extracted by means of solvent extraction 42 to produce a loaded copper electrolyte suitable for electrowinning 46. After the solvent extraction stage 42, the loaded organic extractant is subjected to washing and stripping 56. The high copper concentration of about 10–40 grams per liter derived from the atmospheric leaching stage 40 provides significant advantages over conventional solvent extraction/electrowinning plants because much higher loading of the organic is possible, thus reducing the size of the plant for a given tonnage of copper. Stripping of the loaded organic is effected by means of spent acid from the electrowinning stage 46 to obtain a pure copper sulphate solution which is then passed to the electrowinning stage 46.

The raffinate (Stream 17) from the solvent extraction 42 typically contains 0.5–5.0 grams per liter Cu, less than 1 gram per liter Fe, 20–60 grams per liter acid as $H_2SO_4$ and 0.5–4.0 grams per liter chloride.

The raffinate from the solvent extraction stage 42 is divided into two portions. A first portion (Stream 9) comprising about two-thirds of the raffinate is recycled to the atmospheric leach stage 40. A second portion comprising the remainder or about one-third of the raffinate (Stream 18) is sent to the electrodialysis stage 44 to produce a diluate and a concentrate acid solution. The electrodialysis may be operated with a variety of membranes to provide the desired selectivity. With nonselective membranes, virtually all ions in solution, pass into the concentrate (Stream 19) leaving essentially only water in the diluate (Stream 21).

However, in the preferred embodiment being described here, more selective membranes are employed which allow essentially only monovalent cations and monovalent and divalent anions to pass into the concentrate (Stream 19) Thus $H^+$, $Cl^-$, $SO_4^=$ $HSO_4^-$ ions will pass into the concentrate leaving behind other ions such as $Cu^{++}$, $Ca^{++}$, $Zn^{++}$, $Mg^{++}$, $Fe^{++}$ and $Fe^{+++}$ in the diluate (Stream 21).

The electrodialysis process is not 100% efficient, nevertheless, and some of the listed ions will find themselves going into the opposite stream.

Under the conditions of the preferred embodiment, with a selective membrane as described, the diluate solution (Stream 21) typically contains 1–3 grams per liter copper and 8–20 grams per liter sulphuric acid, and the concentrate acid solution (Stream 19) usually contains less than 4 grams per liter copper, 150–220 grams per liter $H_2SO_4$ and 4–10 grams per liter chloride.

Figure 2:
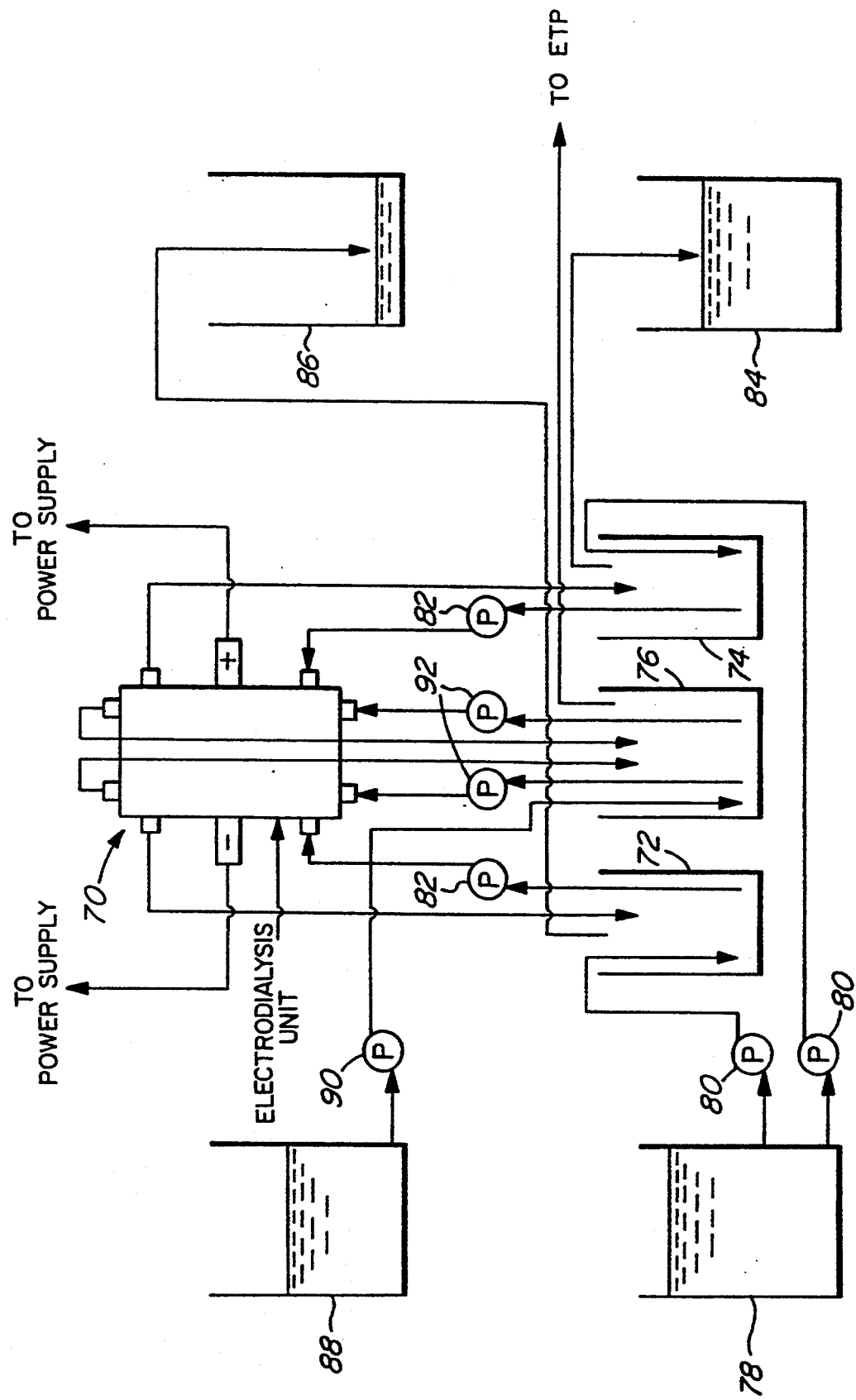
FIG. 2 is a flow diagram of an electrodialysis stage of the process of FIG. 1.

With reference to FIG. 2, the electrodialysis stage 44 will now be described in more detail. It includes an electrodialysis unit 70 which comprises a number of alternating concentrate and diluate compartments separated by alternating cationic and anionic membranes and an anode and a cathode compartment containing an anode and a cathode, respectively. The anionic and cationic membranes are selected from suitable selective membranes for the removal of monovalent and divalent anions, such as $Cl^-$, $HSO_4^-$, $SO_4^{2-}$, and monovalent cations, such as protons. An electrical potential difference is applied between the anode and the cathode to produce a current with a current density in the range of about 100 $A/m^2$ to 1500 $A/m^2$.

The electrodialysis stage 44 further comprises a concentrate recirculation tank 72, a diluate recirculation tank 74 and a recirculation tank 76 for electrode rinse solution.

The raffinate (Stream 18) is fed to a raffinate feed tank 78 from where the raffinate is fed by means of pumps 80 to the diluate compartments. Circulatory flow of diluate and concentrate through the diluate and concentrate compartments, respectively, are produced by means of recirculation pumps 82 at a linear velocity sufficient to maintain turbulent flow in the compartments. A portion of the circulating diluate is withdrawn as the treated diluate solution with reduced concentrations of the ions and passed to a diluate tank 84. A part of the circulating concentrate is also withdrawn and passed to a concentrate tank 86.

The cathode and anode compartments are rinsed separately or with a common rinse solution circulated to both the electrode compartments. The rinse solution is fed from a rinse solution tank 88 by means of a pump 90 to the recirculation tank 76, from where it is circulated by means of pumps 92 to the electrode compartments.

Rinse liquid is bled from the tank 76 to an effluent treatment pond.

Normally the membranes which are effective for acid recovery such as monovalent and divalent selective anionic membranes and monovalent selective cationic membranes, are not as effective with respect to chloride ions, resulting in only about 30%–40% recovery of chloride ions. On the other hand, membranes which are effective for the recovery of chloride ions are not so effective for the recovery of acid. Thus, to render both the acid and chloride ion recovery effective, it has been found expedient to carry out the electrodialysis in two stages. In a first stage, membranes are used which are effective for acid recovery, and the diluate from the first stage is then treated in a second stage using different membranes which are effective for the recovery of chloride ions, such as SELEMION TM CMR and ASR membranes. The concentrate from the first stage, which contains the concentrated acid and some chloride, can then be combined with the concentrate from the second stage, containing the chloride concentrate, to form the concentrate (Stream 19).

Typically the concentrate stream (Stream 19) from the electrodialysis stage 44 will be about 10–20% of the feed flow, whereas the diluate stream (Stream 21) comprises the rest or 80–90% and contains the bulk of the water in the feed stream, as well as any ions that have been rejected by the membranes, such as $Cu^{2+}$ present in the feed. It is desirable to recover such $CuSO_4$ and this is effected in the process according to the present invention by subjecting the diluate stream to an auxiliary or secondary solvent extraction circuit 58. The circuit 58 comprises an extracting stage 64 and a stripping stage 66, for the extraction and stripping operations, respectively. The concentrate acid solution from the electrodialysis stage 44 can be used as stripping acid in the stripping stage 66 to strip the copper from the loaded organic. The acid solution resulting from the stripping stage 66 is 140–200 grams per liter sulphuric acid which is recycled to the pressure leach stage 38. Typically the feed to this circuit (the diluate stream) will contain about 1.0–3.0 grams per liter copper and the raffinate or waste stream will contain about 0.05–0.1 grams per liter copper. The overall extraction of copper from the leach liquor (Stream 11) in the solvent extraction, electrodialysis and electrowinning stages, of the process has been found to be as high as 99.7%.

As already noted, in this particular embodiment, the electrodialysis stage 44 is selective, i.e. copper ions are in the diluate stream (Stream 21).

As noted above, the residue from the pressure leaching stage 38 (Stream 7) comprises a mixture of elemental sulphur ($S^0$), hematite ($Fe_2O_3$) and mainly basic copper sulphate. This residue is fed to the atmospheric leaching stage 40 where the basic copper sulphate is dissolved in acid as far as possible, leaving the hematite and elemental sulphur components essentially untouched. This produces a solution of copper sulphate ($CuSO_4$) (Stream 11) which is fed to the solvent extraction stage 42, where copper is exchanged with an organic ligand (R-H), producing acid in the aqueous stream, the raffinate (Stream 17). The reactions can be summarized as follows:

Atmospheric Leaching Stage:

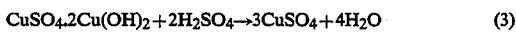

$$CuSO_4.2Cu(OH)_2 + 2H_2SO_4 \rightarrow 3CuSO_4 + 4H_2O \qquad (3)$$

Solvent Extraction Stage:

$$3CuSO_4 + 6R\text{-}H \rightarrow 3R_2Cu + 3H_2SO_4 \qquad (4)$$

Thus the overall reaction can be represented as follows:

$$CuSO_4.2Cu(OH)_2 + 6R\text{-}H \rightarrow 3R_2Cu + H_2SO_4 + 4H_2O \qquad (5)$$

There is thus one extra mole of acid produced for every three moles of Cu leached in the atmospheric leach. In order to make use of this extra mole of $H_2SO_4$, the raffinate stream from the solvent extraction stage 42 is split, as noted above, so that two-thirds thereof (Stream 9) are returned to the atmospheric leaching stage 40 and the remaining one-third (Stream 18) is fed to the electrodialysis stage 44 to produce the acid concentrate which is fed to the pressure leaching stage 38.

An additional benefit of the process according to the invention is that chloride ions lost from the pressure leach circuit into the pressure leach residue, either as insoluble basic copper chloride or as entrained solution losses in the filter cake, can be recycled along with the acid concentrate back to the pressure leach. Any chloride ions present in the pressure leach residue will report almost quantitatively to the atmospheric leach liquor and thence to the raffinate after solvent extraction. If not bled from this circuit they would quickly build up to higher levels in the atmospheric leach liquor and eventually transfer to the electrowinning circuit where chloride is particularly undesirable. By splitting the raffinate from the solvent extraction stage 42, as noted above, and treating one-third thereof through the electrodialysis stage 44 and solvent extraction 58, this effectively recycles the chloride content back to the pressure leach thereby minimizing any chloride makeup requirements therein.

The efficiency of the process according to the invention may be gauged from the overall reaction for the entire process. If reactions (3) and (4) are combined with the reactions for pressure leaching (6), solvent stripping (7) and electrowinning (8), as given below, then it can be seen that the overall reaction (9) for the entire process does not produce or consume any acid or chloride ions. Thus the process neither requires acid nor neutralization if these reactions are strictly adhered to. In practice, however, as already mentioned, about 5–10% of the sulphur in concentrate is oxidized to acid.

Pressure Leaching Stage:

$$3CuFeS_2 + 15/4O_2 + H_2O + H_2SO_4 \rightarrow [CuSO_4 \cdot 2Cu(OH)_2] + 3/2Fe_2O_3 + 6S^0 \quad (6)$$

Solvent Stripping Stage:

$$3R_2Cu + 3H_2SO_4 \rightarrow 3CuSO_4 + 6R-H \quad (7)$$

Electrowinning Stage:

$$3CuSO_4 + 3H_2O \rightarrow 3Cu^0 + 3/2O_2 + 3H_2SO_4 \quad (8)$$

Overall Process Reaction:

$$3CuFeS_2 + 15/4O_2 \rightarrow 3Cu^0 + 3/2Fe_2O_3 + 6S^0 + 3/2O_2 \quad (9)$$

With the process according to the present invention, relatively high copper recoveries, typically 97 to 98% at quite low temperatures in the atmospheric leach, such as 40° C., have been obtained. Such low temperatures are known to suppress iron dissolution and test results have shown only about 200 ppm Fe with 10 grams per liter Cu in the atmospheric leach solution after filtration 50 (Stream 11). This is a marked improvement over prior art processes, such as described in U.S. Pat. No. 4,338,168, which reports only about a 93% recovery at this temperature and requires higher temperature and/or acid levels to obtain satisfactory copper recovery values. Unfortunately, such more severe conditions also dissolves about 50% of the Fe in the feed to the atmospheric leaching stage 40 complicating the process by requiring the addition of a jarosite precipitation process to separate the Fe from the copper. In the present process the Fe is rejected in the atmospheric leach residue.

Due to the reduction in sulphur oxidation and the effective recycling of the sulphuric acid as described, the process according to the invention does not require any special neutralization procedure. Since only about 5–10% of the sulphur is oxidized to sulphate only a relatively small amount of acid is produced which can effectively be taken care of by a lime neutralization process (Stream 35) which is required in any event for the treatment 68 of the final effluent from the solvent extraction cycle 58, which is the bleed of impurities such as Zn and Mg from the circuit.

The results of tests which were carried out for the various stages of the process will now be given in the following Examples. In Example 1 the feed to the pressure leach did not contain acid. In Example 2, an acidic feed was charged to the leach.

EXAMPLE 1

The copper concentrate from a porphyry deposit in Highland Valley, British Columbia (Stream 1) is composed of 40.19% copper, 20.50% iron, and 29.24% sulphur. In both Examples 1 and 2, the concentrate was ground to 98%–400 mesh. In Example 1, the charge to the autoclave had a wet weight of 175.1 grams at 14.4% moisture. The solution feed to the leach was a combination of 900 ml of recycled pressure leach filtrate (Stream 8) containing 1.5 grams per liter copper, less than 1 ppm iron and 11.47 grams per liter chloride and 100 ml of water. The makeup water (Stream 31) actually contained 2.8 grams of sodium chloride so that the total chloride concentration in the leach was 12.0 grams per liter. The concentrate was leached for one hour at 200 psi and 150° C. Upon completion of the pressure leach, the slurry (Stream 51) was filtered. The 995 ml of filtrate, Stream 6, contained 1.0 grams per liter copper, less than 1 ppm iron, 8.3 grams per liter sodium, and 11.6 grams per liter chloride and had a pH of 3.9. The total wet weight of the residue from the pressure leach was 323.0 grams. A 91 gram sample was taken for analysis. This sample, on a dry basis, contained 32.4% copper, 16.9% iron, 0.49% sodium and 10.4% elemental sulphur and had a moisture content of 37.7% moisture.

The residue from the pressure leach was subjected to an atmospheric leach for an hour at 40° C. and a pH 1.7. The charge to this leach consisted of 231.6 grams of solids at 37.7% moisture and 2120 ml of water with 30 ml of concentrated $H_2SO_4$ (Stream 9). The slurry from this leach, Stream 10 was filtered to obtain 108.4 grams of residue at 36.2% moisture and a 2120 ml filtrate. The residue was washed once by displacement and resulted in a 245 ml wash water containing 4.2 grams per liter copper and 217 ppm iron. The filtrate, Stream 11, consisted of 23.2 grams per liter copper, 403 ppm iron, 420 ppm sodium, and 1.2 grams per liter chloride. The pH of the filtrate was 1.7 and had a free acid of 3.1 grams per liter. The residue from the leach contained 2.52% copper, 0.16% sodium and 28.9% iron. The results of this example are given below in Tables 1 and 2.

EXAMPLE 2

To reduce sulphur oxidation, sulphuric acid was added to the feed of the pressure leach. The sulphuric acid provided the sulphur needed to form Basic Copper Sulphate instead of oxidizing sulphur in the concentrate. The following equation defines the reaction which is occurring:

$$CuFeS_2 + 5/4O_2 + 1/5H_2O + \tfrac{1}{3}H_2SO_4 \rightarrow [\tfrac{1}{3}CuSO_4 \cdot \tfrac{2}{3}Cu(OH)_2] + \tfrac{1}{2}Fe_2O_3 + 2S^0 \quad (10)$$

This addition of acid to the feed of the leach reduces the sulphur oxidation from 28% to 9%. The charge to the present leach consisted of 183.0 grams of wet concentrate at 16% moisture. Since the actual liquor from a past pressure leach, Stream 8, and the concentrated acid from the electrodialysis/solvent extraction, Stream 60, were unavailable, these feeds were made synthetically. The pressure leach was charged with 1000 ml of feed solution having a chloride concentration of 12.0 grams per liter and a free acid concentration of 27.0 grams per liter. The concentrate was leached for an hour at 200 psi and 150° C. The slurry from this leach, Stream 51, was filtered. The 1025 ml filtrate, Stream 6, contained 6.0 grams per liter copper, 20 ppm iron, 6.0 grams per liter sodium, and 10.4 grams per liter chloride. The pH of the filtrate was 3.1. The residue weighed 331.5 grams wet from which a 48 gram sample was taken. The residue had a moisture content of 32.6% and contained 25.4% copper, 13.6% iron, 0.23% sodium and 18.41% elemental sulphur.

As in Example 1, the residue from the pressure leach was subjected to an atmospheric leach. Approximately 284 grams of wet residue from the pressure leach was combined with 3500 ml of acidic water (Stream 9). The residue was leached for an hour at 40° C. at a pH of 1.5. The slurry from this leach was once again filtered to obtain 3205 ml of filtrate, Stream 11, and 132.2 grams of wet residue. The residue was washed with 385 ml of water and produced a wash water with 3.38 grams per liter copper and 143 ppm iron. The filtrate contained 11.9 grams per liter copper and 580 ppm iron. The residue had a moisture content of 28.1% and consisted of 1.65% copper, 0.03% sodium and 16.23% iron.

COMPARISON OF EXAMPLES 1 AND 2

To compare the effect of adding acid to the feed of the pressure leach on the leaching of copper, the following tables illustrate the copper extraction and the sulphur oxidation for both tests.

TABLE 1

| | Copper extraction for tests Examples 1 and 2 | | | | | | |
|---|---|---|---|---|---|---|---|
| | Feed Copper | | | Residue Copper | | | % |
| Example | Dry wt. (g) | % Cu | g Cu | Dry wt. (g) | % Cu | g Cu | Extraction |
| 1 | 150.0 | 40.19 | 60.2 | 96.2 | 2.52 | 2.42 | 96.0 |
| 2 | 153.7 | 40.19 | 61.8 | 110.9 | 1.65 | 1.83 | 97.0 |

With the addition of sulphuric acid to the feed of the pressure leach, the extraction of copper increased. The percentage copper remaining behind in the residue of the atmospheric leach, Stream 12, decreased from 2.52% to 1.65%. The extraction of copper increased from 96% to 97% in Example 2.

TABLE 2

| | % Sulphur oxidation | |
|---|---|---|
| | % Sulphur Oxidation | |
| Example | Sulphur Balance Method | Acid Generation Method |
| 1 | 28 | n.a |
| 2 | 9 | 9 |

As can be seen, the amount of sulphur oxidation was reduced dramatically from Example 1 to Example 2.

EXAMPLE 3 TO 6

In order to determine the optimum acid addition to the feed of the pressure leach, four tests (Examples 3 to 6) were ran consecutively. The goal of these tests was to vary the acid concentration, Stream 60, so that the copper in the feed, Stream 8, and in the filtrate, Stream 6, after the pressure leach were in equilibrium. The following table summarizes the results of this work.

TABLE 3

| | Results of Acid Addition | | | | |
|---|---|---|---|---|---|
| Example | Acid in feed (g/L) (Streams 8 and 60 combined) | Cu in Feed (g) (Streams 8 and 60 combined) | Cu in Filt. (g) (Stream 6) | Gain/Loss in Filtrate (g) | pH Filt. |
| 3 | 27.3 | 4.1 | 9.7 | 5.6 | 3.2 |

TABLE 3-continued

| | Results of Acid Addition | | | | |
|---|---|---|---|---|---|
| Example | Acid in feed (g/L) (Streams 8 and 60 combined) | Cu in Feed (g) (Streams 8 and 60 combined) | Cu in Filt. (g) (Stream 6) | Gain/Loss in Filtrate (g) | pH Filt. |
| 4 | 22.5 | 7.0 | 10.38 | 3.3 | 3.7 |
| 5 | 24.0 | 8.1 | 7.1 | −1.0 | 3.3 |
| 6 | 23.0 | 6.7 | 4.0 | −2.7 | 3.6 |

Note: Pressure Leach Conditions - 60 min., 150° C., 300 psig total pressure (about 245 psi oxygen partial pressure), 225 grams per liter concentrate At 27.3 grams per liter acid in the feed, the filtrate gained 5.6 grams copper indicating that too much acid had been added to the feed. At 23.0 grams per liter acid in the feed, the filtrate lost copper indicating that too little acid had been added to the feed. Based on these results, the equilibrium acid concentration in the feed to the pressure leach was set at 25.0 grams per liter.

The difference in the acidity of the feed and filtrates indicates that the acid was consumed during the leach. This is an indication that the sulphate content of the Basic Copper Sulphate is principally derived from the sulphuric acid in the feed and not from oxidation of sulphur in the concentrate.

To further illustrate that 97% of the copper is leached in this process, the following table summarizes the copper extractions for the tests. The extractions of copper were above 97% in all the tests except Example 4. The sulphur oxidations were all below 7.4%

TABLE 4

| Copper extractions for Examples 3–6 | | |
|---|---|---|
| Example | % Cu Extraction | % Sulphur Oxidation |
| 3 | 97.2 | 6.73 |
| 4 | 95.4 | 7.39 |
| 5 | 97.7 | 5.64 |
| 6 | 98.0 | 7.36 |

EXAMPLE 7

Solvent Extraction and Stripping Process

A solvent extraction and stripping test was performed and used as an example to demonstrate the solvent extraction and solvent stripping unit operations of the process of FIG. 1.

A copper sulphate filtrate solution from the atmospheric leach corresponding to Stream 11, and containing 9.5 grams per liter copper and 3.75 grams per liter sulphuric acid at pH 1.6 was subjected to solvent extraction and solvent stripping in the solvent extraction unit. A 70% to 30% ratio mixture of LIX 84 to LIX 860 at 30% volume ratio with kerosene was used for the solvent extraction unit operation. A two-stage extraction and two-stage stripping were used. A 2:1 organic to aqueous ratio was used in the two solvent extraction stages and a 3:1 organic to aqueous ratio was used in the two stripping stages. Spent acid (Stream 27) containing 32.9 grams per liter copper and 180 grams per liter acid from the electrowinning was used for stripping the loaded organic (Stream 15) in the stripping circuit.

The copper sulphate pregnant electrode solution produced from the stripping circuit (Stream 25) was found to contain 43.5 grams per liter copper and 146 grams per liter free acid, and was sent for electrowinning. The raffinate produced (Stream 17) was found to contain 0.73 grams per liter copper and 19.4 grams per liter sulphuric acid.

The loaded organic (Stream 15) was found to contain 7.9 grams per liter of copper, and the stripped organic (Stream 20) was found to contain 3.39 grams per liter copper.

EXAMPLE 8A

Electrodialysis (Selective Membranes)

An electrodialysis test was performed and used as an example to illustrate the electrodialysis unit operation of the process of FIG. 1. In this example, selective membranes were used, such that only monovalent cations and mono- and divalent anions were allowed into the concentrate solution. All divalent cations, such as $Cu^{2+}$ or $Zn^{2+}$, remained in the diluate stream, as well as higher valent ions.

The raffinate from the solvent extraction circuit (Stream 18) was subjected to electrodialysis in the electrodialysis unit 44. The raffinate solution was found to contain 890 mg/l copper, 20 grams per liter sulphuric acid and 1.1 grams per liter chloride. SELEMION TM CMV-A cationic and AAV anionic membranes were used. THE CMV-A cationic membranes are designed to pass only monovalent cations into the concentrate leaving divalent and other multi-valent cations behind (in the dilute). The AAV anionic membranes are designed to pass both monovalent and divalent anions into the concentrate. The raffinate solution was passed through an activated carbon column and a polish filter to remove any organic and suspended solids. A current was applied between the electrodes to give a current density of 1000 $A/m^2$. The temperature was controlled at below 45° C. The electrode compartments were rinsed with a rinse solution containing 1 molar sulphuric acid.

The final diluate solution (Stream 21) was analyzed, and was found to contain 0.76 grams per liter copper, 8.9 grams per liter sulphuric acid, and 0.8 grams per liter chloride. The final concentrate acid solution (Stream 19) was found to contain 2.57 grams per liter copper, 168 grams per liter sulphuric acid and 4.1 grams per liter chloride. Both the diluate solution and the concentrate acid solution were treated in the secondary solvent extraction and stripping process to produce a final raffinate solution (Stream 63) to the effluent treatment stage 68 and a concentrate acid solution (Stream 60) back to the pressure leaching stage 38.

TABLE 5

Results of Example 8A

| | Flow rate (ml/min) | Assay (g/L) | | | Distribution (%) | | |
|---|---|---|---|---|---|---|---|
| | | Acid | Cu | Cl | Acid | Cu | Cl |
| FEED | 186 | 20 | 0.89 | 1.1 | 100 | 100 | 100 |
| DILUATE | 171 | 8.9 | 0.76 | 0.8 | 41 | 79 | 67 |
| CONCENTRATE | 15 | 168 | 2.57 | 4.1 | 68 | 23 | 30 |

EXAMPLE 8B

Electrodialysis (Non-selective Membranes)

A further electrodialysis test was performed and used as an example to illustrate the electrodialysis unit operation of the process of FIG. 1. However, in this particular example, a non-selective membrane was used, i.e. all monovalent and divalent ions were allowed into the concentrate solution.

The raffinate from the solvent extraction circuit (Stream 18) was subjected to electrodialysis in the electrodialysis unit. The raffinate solutions from the solvent extraction were mixed and used as feed to the electrodialysis. The raffinate solution was found to contain 700 mg/l copper and 20 grams per liter sulphuric acid. SELEMION TM CMV cationic and AAV anionic membranes were used. These membranes are designed to pass both monovalent and divalent cations and anions into the concentrate. The raffinate solution was passed through an activated carbon column and a polish filter to remove any organic and suspended solids. The total organic carbon in the raffinate was reduced from 7.84 ppm to 1.53 ppm after passing through the activated carbon column and the polish filter. The solution was then fed to the electrodialysis unit at a rate of 163 ml/minute. A current was applied between the electrodes to give a current density of 1000 $A/m^2$. The temperature was controlled at below 40° C. The electrode compartments were rinsed with a rinse solution containing 1 molar sulphuric acid.

The final diluate solution (Stream 21) was analyzed, and was found to contain 261 mg/l copper and 9.5 grams per liter sulphuric acid. The final concentrate acid solution (Stream 19) was found to contain 7.32 grams per liter copper and 169 grams per liter sulphuric acid. Both the diluate solution and the concentrate acid solution was treated in the auxiliary solvent extraction and stripping process to produce a final raffinate solution (Stream 63) containing less than 100 mg/l copper which is sent to the effluent treatment stage 68.

TABLE 6

Results of Example 8B

| | Flow rate (ml/min) | Assay (g/L) | | | Distribution (%) | | |
|---|---|---|---|---|---|---|---|
| | | Acid | Cu | Cl | Acid | Cu | Cl |
| FEED | 163 | 20 | 0.77 | 1.42 | 100 | 100 | 100 |
| DILUATE | 152 | 9.5 | 0.26 | 0.89 | 44 | 32 | 58 |
| CONCENTRATE | 11 | 169 | 7.32 | 8.17 | 57 | 64 | 39 |

EXAMPLE 9

Auxiliary Solvent Extraction

A solvent extraction was performed and used as an example to illustrate the auxiliary solvent extraction and stripping 66 unit operations of the process of FIG. 1.

The diluate solution from the electrodialysis unit (Stream 21) was subjected to auxiliary solvent extraction 64. Diluate solutions from electrodialysis were mixed and used as feed to this test. The diluate was found to contain 264 mg/l copper and 9.0 grams per liter sulphuric acid at pH 1.02. A 70% to 30% volume ratio mixture of LIX 84 to LIX 860 at 30% volume ratio with kerosene was used for the auxiliary solvent extraction and stripping operations. A one stage extraction and one stage stripping was used at a 1:1 organic to aqueous ratio in the extraction stage and a 10:1 organic to aqueous ratio in the stripping stage. Concentrate acid solution (Stream 19), containing 5.36 grams per liter copper and 180 grams per liter acid, was used for stripping the loaded organic (Stream 61) in the stripping circuit.

The copper sulphate solution produced (Stream 60) from the stripping circuit was found to contain 8.8 grams per liter copper and 161.3 grams per liter free acid, and was recycled back to pressure leaching. The final raffinate produced (Stream 63) was found to contain 66 mg/l copper and 12.3 grams per liter sulphuric acid, and the raffinate is sent to effluent treatment operation.

The loaded organic (Stream 61) was found to contain 1.7 grams per liter of copper, and the stripped organic (Stream 62) was found to contain 1.1 grams per liter copper.

EXAMPLE 10

Copper Electrowinning

A copper electrowinning test was performed and used as an example to demonstrate the copper electrowinning unit operations of the process of FIG. 1.

A copper sulphate electrolyte produced from the solvent extraction unit operation (Stream 25) was subjected to electrowinning in the electrowinning unit. Copper electrolyte from the solvent extraction stage was used in this test and the copper electrolyte was 43.5 grams per liter copper and 146 grams per liter sulphuric acid. About 10 mg/l of animal glue was added to the electrolyte solution to provide cathode deposit control and to counteract the negative effect of trace impurities on cathode deposit. A current was applied between the electrodes to give a current density of 300 A/m². A voltage drop of 2 volts per cell from anode to cathode was used. The temperature was maintained at 35° C. and the unit was operated for 8.4 hours.

A high quality copper was produced at the cathodes (Stream 28) at a current efficiency of 97.8%. The spent acid from electrowinning (Stream 27) was found to contain 28.5 grams per liter copper and 177 grams per liter sulphuric acid, and was recycled and used as stripping acid for the solvent extraction unit.

While the process has been described with specific reference to a chalcopyrite concentrate, it will be appreciated that the process can also be applied to concentrates of other copper sulphide minerals, such as bornite ($Cu_5FeS_4$), covellite ($CuS$), chalcocite ($Cu_2S$), enargite ($Cu_3AsS_4$), tetrahedrite ($Cu_3SbS_3$), and the like, or mixtures thereof.

As an alternative to subjecting the raffinate from the solvent extraction 42 to the electrodialysis step 44, to produce a concentrated sulphuric acid solution for recycling to the first leaching step 38, it is also possible to produce a concentrated copper sulphate solution by subjecting the raffinate to the electrodialysis step 44, by the choice of a suitable membrane and recycling the concentrated copper sulphate as produced to the first leach 38 to serve as a source of sulphate ions required for the leach 38. In this case the electrodialysis is non-selective, i.e. the copper ions are allowed into the concentrate stream (Stream 19) with the acid. The reaction taking place in the pressure leach stage 38 can be represented as follows:

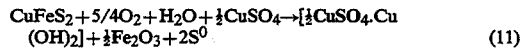

Electrodialysis processes are described in U.S. Pat. Nos. 5,064,538, 5,084,180 and 5,110,432, the entire contents of which is incorporated herein by reference. A description and example of the selective process is given in U.S. Pat. No. 5,084,180, column 5, line 22 to line 19, column 6 and Example 5 of U.S. Pat. No. 5,064,538, respectively. This relates to a zinc sulphate solution, but is also applicable to a copper sulphate solution. An example of a non-selective process is given in Example 3 (column 11) of U.S. Pat. No. 5,110,432.

In yet a further alternative method, the sulphate ions may be provided from another source, which may be external to the rest of the process, such as by the addition of a metal sulphate, which will hydrolyze under the leaching conditions and thus produce acid in situ, such as $Fe_2(SO_3)_3$, to the pressure leach stage 38, in which case the reaction taking place can be represented as follows:

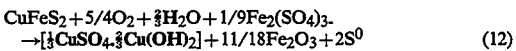

While the application of an electrodialysis stage after a solvent extraction stage for obtaining a concentrated acid solution for recirculation to the pressure leaching stage, has been described with particular reference to the chloride-assisted hydrometallurgical copper extraction process given as a particular example above, it will be appreciated that the combination of solvent extraction and electrodialysis steps can be utilized in other applications where a concentrated acid or other concentrated solution is required, such as for recirculation to an earlier stage in a process, such as to a leaching stage as in the present example. The combination of an electrodialysis stage with a solvent extraction stage is expected to be useful in many applications not necessarily including a pressure leach stage, eg. leaching of an oxide ore, when confronted with the problem of having to produce a concentrated acid solution out of the raffinate where the raffinate has been diluted due to water addition.

While only preferred embodiments of the invention have been described herein in detail, the invention is not limited thereby and modifications can be made within the scope of the attached claims.

What is claimed is:

1. A process for the extraction of copper from a sulphide copper ore or concentrate, comprising the steps of:
    subjecting the ore or concentrate to a first leaching in the presence of oxygen and a lixiviant comprising an acidic solution of chloride and bisulphate or sulphate ions to produce an insoluble basic copper salt;
    leaching the basic copper salt produced by said first leaching step in a second leaching with an acidic sulphate solution to dissolve the basic copper salt to produce a leach liquor containing copper sulphate in solution;
    subjecting said leach liquor to a solvent extraction process to produce a copper concentrate solution and a raffinate comprising protons and bisulphate or sulphate ions in solution;
    extracting protons and bisulphate or sulphate ions from said raffinate to produce a sulphuric acid solution; and
    recycling said sulphuric acid solution to said first leaching to serve as a source of said bisulphate or sulphate ions in said lixiviant.

2. The process according to claim 1, wherein said raffinate is subjected to electrodialysis to effect said extraction of protons and bisulphate or sulphate ions therefrom.

3. The process according to claim 2, wherein said raffinate is split into a first portion comprising about two-thirds of said raffinate and a second portion comprising about one-third of said raffinate and wherein said first portion is recycled to said second leaching and wherein said second portion comprises said raffinate which is subjected to said electrodialysis.

4. The process according to claim 3, wherein said electrodialysis produces a concentrate stream containing said sulphuric acid solution and a diluate stream containing copper ions in solution.

5. The process according to claim 4, further comprising the steps of subjecting said diluate stream to an auxiliary solvent extraction step to extract said copper ions therefrom and combining said extracted copper ions with said concentrate stream containing said sulphuric acid, prior to recycling said sulphuric acid to said first leaching at elevated temperature and pressure.

6. The process according to claim 3, further comprising the steps of extracting chloride ions from said second raffinate portion during said electrodialysis and recycling said chloride ions with said sulphuric acid solution to said first leaching at elevated temperature and pressure.

7. The process according to claim 1, wherein said first leaching is carried out at a temperature of from about 125° C.–175° C.

8. The process according to claim 1, wherein said first leaching is carried out at an oxygen partial pressure from about 50 psig (345 kPa) to about 250 psig (1725 kPa).

9. The process according to claim 1, wherein said insoluble basic copper salt comprises a mixture of basic copper sulphate and basic copper chloride.

10. A process for the extraction of copper from a sulphide copper ore or concentrate, comprising the steps of:
subjecting the ore or concentrate to a first leaching in the presence of oxygen and a lixiviant comprising an acidic solution of chloride and bisulphate or sulphate ions to produce an insoluble basic copper salt;
leaching the basic copper salt produced by said first leaching step in a second leaching with an acidic sulphate solution to dissolve the basic copper salt to produce a leach liquor containing copper sulphate in solution;
subjecting said leach liquor to a solvent extraction process to produce a first copper concentrate solution and a raffinate comprising protons, copper ions and bisulphate or sulphate ions in solution;
extracting copper ions and bisulphate or sulphate ions from said raffinate to produce a second copper concentrate solution;
recycling said second copper concentrate solution to said first leaching to serve as a source of said bisulphate or sulphate ions in said lixiviant; and
subjecting said first copper concentrate solution to electrowinning to recover copper values therefrom.

11. The process according to claim 10, wherein said raffinate is subjected to electrodialysis to effect said extraction of copper and bisulphate or sulphate ions therefrom.

12. The process according to claim 11 wherein said raffinate is split into a first portion comprising about two-thirds of said raffinate and a second portion comprising about one-third of said raffinate and wherein said first portion is recycled to said second leaching at atmospheric pressure and wherein said second portion comprises said raffinate which is subjected to said electrodialysis.

13. The process according to claim 12, further comprising the steps of extracting chloride ions from said second raffinate portion during said electrodialysis and recycling said chloride ions with said second copper concentrate solution to said first leaching at elevated temperature and pressure.

14. A process for the extraction of copper from a sulphide copper ore or concentrate, comprising the steps of:
subjecting the ore or concentrate to a first leaching in the presence of oxygen and an acidic solution containing chloride ions and a source of bisulphate or sulphate ions to produce an insoluble basic copper sulphate salt, wherein said source of bisulphate or sulphate ions is selected from the group consisting of sulphuric acid and a metal sulphate which hydrolyzes in said acidic solution and wherein the amount of said source of bisulphate or sulphate ions which is added contains at least the stoichiometric amount of sulphate or bisulphate ions required to produce said basic copper sulphate salt.

15. In a hydrometallurgical copper extraction which includes a solvent extraction stage, a method of producing a concentrated sulphuric acid solution from a raffinate from said solvent extraction stage comprising the steps of:
subjecting said raffinate to electrodialysis using cationic and anionic membranes to produce a concentrate stream containing concentrated sulphuric acid and a diluate stream;
subjecting said diluate stream to an auxiliary solvent extraction step to extract copper ions therefrom; and
combining said extracted copper ions with said concentrate stream.

16. The process according to claim 15, further comprising a pressure leaching stage before said solvent extraction stage and wherein said concentrate stream combined with said extracted copper ions is recycled to said pressure leaching stage.

* * * * *